United States Patent
Truong et al.

(10) Patent No.: US 6,819,934 B1
(45) Date of Patent: Nov. 16, 2004

(54) SYSTEM AND METHOD FOR POWER MANAGEMENT IN A MULTI-CHANNEL POWER AMPLIFIER (MCPA) ENVIRONMENT

(75) Inventors: Dung H. Truong, Richardson, TX (US); Thai N. Nguyen, Plano, TX (US)

(73) Assignee: Nortel Networks, Limited, St. Laurent (CA)

( * ) Notice: Subject to any disclaimer, the term of this patent is extended or adjusted under 35 U.S.C. 154(b) by 625 days.

(21) Appl. No.: 09/706,044

(22) Filed: Nov. 3, 2000

(51) Int. Cl.[7] ................................................ H04Q 7/20
(52) U.S. Cl. .................... 455/522; 455/69; 455/561; 370/337
(58) Field of Search .................... 455/522, 69, 500, 455/70, 561, 67.1, 127.1, 127.3, 127.5; 370/337, 331, 332, 347

(56) References Cited

U.S. PATENT DOCUMENTS

| | | | | |
|---|---|---|---|---|
| 5,448,750 A | * | 9/1995 | Eriksson et al. ......... | 455/452.2 |
| 5,832,387 A | * | 11/1998 | Bae et al. ................. | 455/522 |
| 6,236,864 B1 | * | 5/2001 | McGowan et al. ......... | 455/522 |
| 6,262,981 B1 | * | 7/2001 | Schmutz ................... | 370/347 |
| 6,324,403 B1 | * | 11/2001 | Jalloul ....................... | 455/453 |
| 6,334,058 B1 | * | 12/2001 | Nystrom et al. ........... | 455/453 |
| 6,400,966 B1 | * | 6/2002 | Andersson et al. ......... | 455/561 |
| 6,477,388 B1 | * | 11/2002 | Schmutz ................... | 455/522 |
| 6,542,482 B1 | * | 4/2003 | Johansson et al. ......... | 370/331 |
| 6,662,018 B1 | * | 12/2003 | Kintis et al. ............... | 455/522 |
| 6,694,148 B1 | * | 2/2004 | Frodigh et al. ............ | 455/522 |

\* cited by examiner

*Primary Examiner*—Tilahun Gesesse
(74) *Attorney, Agent, or Firm*—Haynes and Boone, LLP

(57) ABSTRACT

A method and system is provided for intelligently managing a multi-channel power amplifier (MCPA) in a telecommunications network. The MCPA usually has a plurality of amplifier modules pooled together to provide power to mobile carriers under its coverage. The MCPA deals with an unexpected failure of its amplifier module or an unexpected capacity increase by maximizing the usage of available power output of the MCPA.

23 Claims, 3 Drawing Sheets

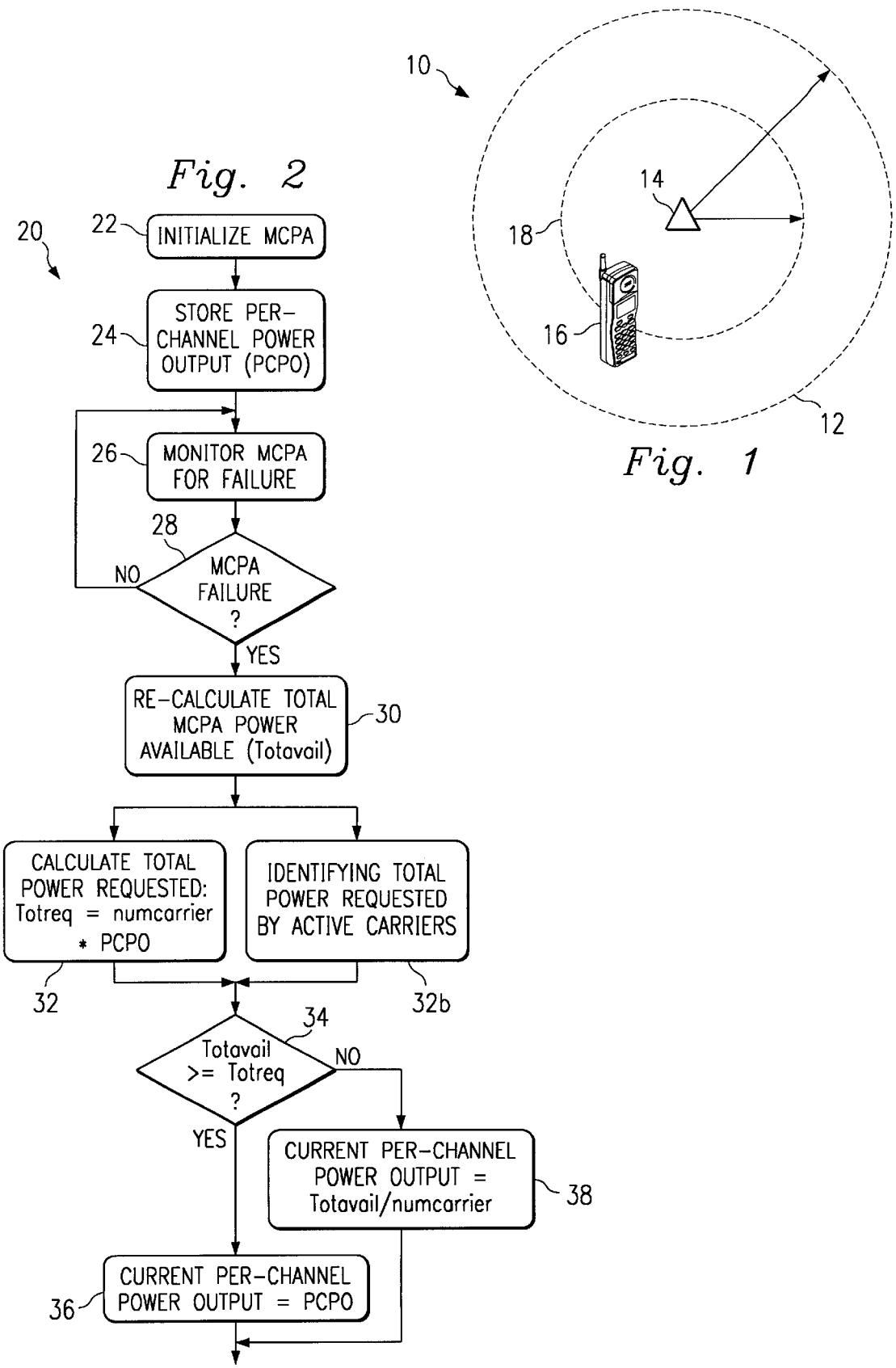

SYSTEM AND METHOD FOR POWER MANAGEMENT IN A MULTI-CHANNEL POWER AMPLIFIER (MCPA) ENVIRONMENT

BACKGROUND OF THE INVENTION

The present invention relates generally to capacity and power planning for telecommunication systems, and more particularly, to a system and method for intelligently managing the power distribution for mobile carriers under the control of a Multi-Channel Power Amplifier System (MCPA).

In a telecommunication system, the carrier power amplifiers are designed to deliver a specific RF power level that is guaranteed to be available on a per carrier basis (i.e., a per-channel power output level). With the introduction of base station dynamic power control feature, the MCPA module can be pooled together and serve as a shared power source for multiple mobile carriers satisfying transmission power requirements of all the carriers under the control. The MCPA system usually connects to multiple transceiver units, each transceiver being responsible for providing the planned power to a particular mobile carrier. The maximum power any transceiver can output, or any carrier can receive, is based on an initialization process of the MCPA system.

Conventionally, the MCPA initialization process instructs the power available to be evenly distributed among all mobile carriers. The MCPA system was designed to adjust an amplification gain automatically to achieve the target output power level during the initialization process. This initialization process requires an operator using a portable PC to interface with the MCPA system while a predetermined number of mobile carriers are transmitting. The operator shall identify a desired number of channels for the covered mobile carriers and the output power level per carrier. The number of channels selected in this process usually refers to the number of channels that are currently transmitting.

Since the MCPA system pools together multiple MCPA modules to form a single power source, when one MCPA module goes down due to some unexpected failure, the maximum MCPA output power for each channel is subsequently reduced in half according to the current art. This indiscriminating reduction of power causes a waste of available power of the MCPA system.

In another scenario, when the capacity of a module is overdriven, there are more channels or mobile carriers that are transmitting (for example, when more mobile carriers are brought up or when EDGE radios are used under certain circumstances), the MCPA will reduce the output a power to each channel (or each mobile carrier) across the board so that it can accommodate the added mobile carriers. This reduction of power will cause the MCPA to "re-initialize" the maximum per-channel power output to a reduced power level.

This behavior of the MCPA is not desirable in that an unscheduled reduction of power shrinks a cell site footprint set by the power level of the MCPA, and some mobile carriers can simply be dropped or calls can be interrupted.

Furthermore, with traffic being uniformly distributed and nonlocalized, not all mobile carriers will require maximum base station transmit power at the same time. Therefore, not all transceivers will be at their maximum transmit power at all times, which means there will be unused power remaining that could be used elsewhere.

What is needed is an intelligent management of power output from the MCPA.

SUMMARY OF THE INVENTION

A method and system is provided for intelligently managing a multi-channel power amplifier (MCPA) in a telecommunications network. The MCPA usually has a plurality of amplifier modules pooled together to provide power to mobile carriers under its coverage.

In one example of the present invention, during an initialization process of the MCPA, a maximum value of per-channel power output under the coverage of the MCPA is determined and stored. Upon a failure of at least one amplifier module, a total power available from the MCPA is calculated. A total requested power of mobile carriers is also obtained upon the failure of the amplifier module. Each mobile carrier is provided with the stored maximum value of per-channel power output if the obtained total requested power of mobile carriers is less than or equal to the calculated total power available from the MCPA. If the obtained total number of mobile carriers is more than the stored maximum number of mobile carriers, the per-channel power output for each mobile carrier output will be reduced.

In another example of the present invention, during an initialization process of the MCPA, a maximum value of per-channel power output under the coverage of the MCPA is determined and stored. Upon a failure of at least one amplifier module, a total power available from the MCPA is calculated. What is also identified is a maximum number of mobile carriers supportable by the MCPA upon the failure of the amplifier module. Further, a total number of the active mobile carriers is identified, and each mobile carrier is provided with the stored per-channel power output if the identified total number of active mobile carriers is less than or equal to the calculated maximum number of mobile carriers.

If the identified total number of active mobile carriers is more than the calculated maximum number of mobile carriers, the per-channel power output for each mobile carrier output is reduced.

In yet another example of the present invention, during an initialization process of the MCPA, a maximum value of per-channel power output under the coverage of the MCPA and a maximum number of mobile carriers supportable by the MCPA are determined and stored. The total number of the active mobile carriers will be constantly monitored, and the per-channel power output for each mobile carrier will be adjusted according to a change of the monitored total number of the active mobile carriers. If the monitored total number of the active mobile carriers is less than or equal to the stored maximum number of mobile carriers supportable by the MCPA, the per-channel power output for each mobile carrier is maintained at the level of the stored per-channel power output. If the monitored total number of the active mobile carriers is more than the stored maximum number of mobile carriers supportable by the MCPA, the per-channel power output is reduced evenly for each mobile carrier.

As an alternative, the per-channel power output can be reduced evenly for each mobile carrier if the total power available at the MCPA is less than or equal to a total power requested by each monitored mobile carrier. As another alternative, a Bit Error Rate of each active mobile carrier can be monitored, and a supply of the power from the MCPA to a mobile carrier can be eliminated if the monitored Bit Error Rate is more than the predetermined value.

BRIEF DESCRIPTION OF THE DRAWINGS

FIG. 1 illustrates a graphical representation of a Multi-Channel Power Amplifier System's coverage area with respect to different levels of power outputs.

FIG. 2 illustrates a flow diagram for intelligently managing the MCPA output power according to one example of the present invention.

DESCRIPTION OF THE PREFERRED EMBODIMENT

Figure 3:
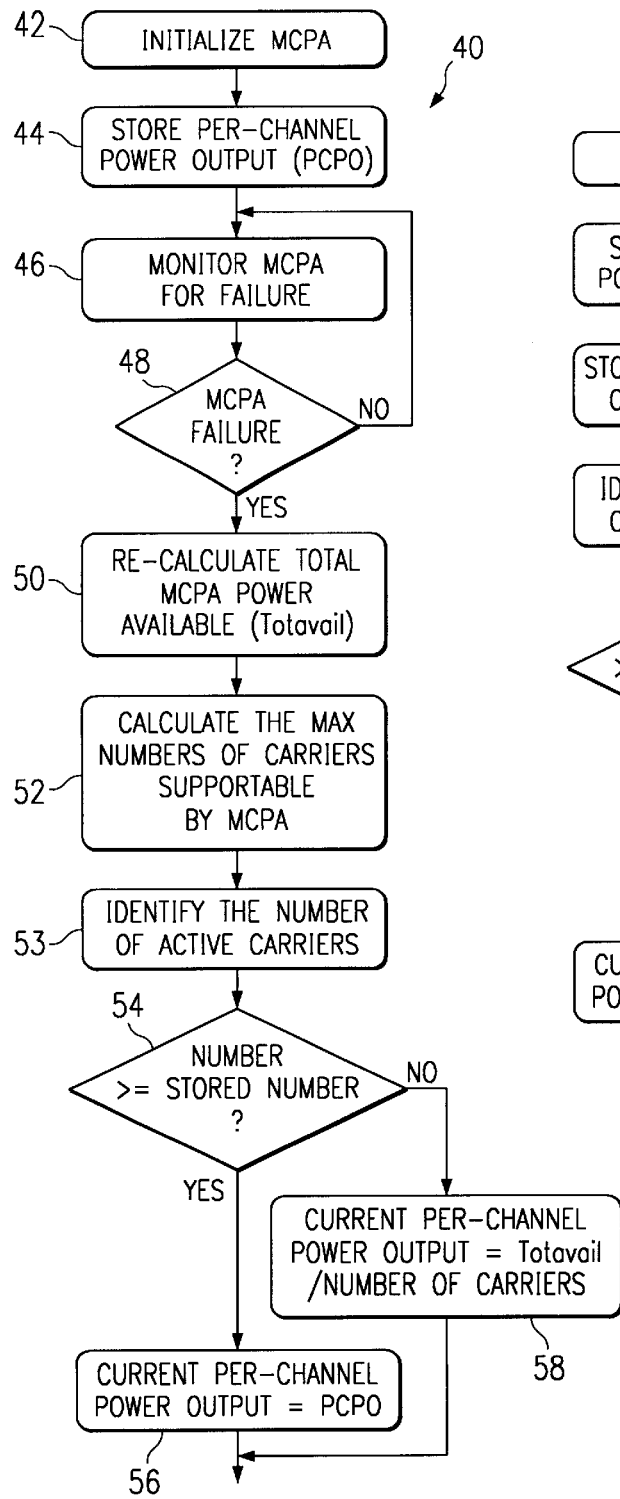
FIG. 3 illustrates a flow diagram for intelligently managing the MCPA output power according to one example of the present invention.

Referring now to FIG. 1, a footprint 10 of a MCPA power output is presented. When the MCPA reduces the per-channel output power in half upon detection of a failure in one of its MCPA modules, all carriers are affected regardless of their functional state. Another form of MCPA per-channel power reduction is triggered through increasing carrier capacity after initialization. For example, when unexpected mobile carriers are added to the territory serviced by the MCPA, the total power consumption will exceed the total output power available from the MCPA and the MCPA will cut the per-channel power as well, which also causes a shrink of the footprint.

When all MCPA modules are functional, the per-channel output power is at a predetermined maximum level as set in the initialization process. The outer circle 12 graphically represents the footprint of the MCPA coverage, while the center of the circle 12 is where the MCPA 14 resides. A mobile carrier 16 such as a mobile phone within the footprint of the MCPA coverage is supplied with the initialized maximum power. When the MCPA cuts all the per-channel output power into half or less than or equal to the predetermined maximum level, the footprint of the MCPA coverage shrinks to the territory defined by the inner circle 18. Therefore, any mobile carrier sitting between the inner circle 18 and the outer circle 16 will no longer be serviced by the MCPA. The radius of the inner circle changes in proportion to the level of power output of the MCPA.

Referring to FIG. 2, a flow diagram 20 is shown for intelligently managing the MCPA output power according to one example of the present invention. After the MCPA is first initialized in step 22, the maximum per-channel power output is stored in a computer memory of MCPA in step 24. In step 26, the functional status of the MCPA is constantly monitored by an external device such as an Alarm Control Unit (ACU). If an MCPA module fails to function properly as illustrated in step 28, the ACU is informed and sends a signal to the MCPA immediately. After knowing that some of its modules are failing, the MCPA would calculate the total power available in step 30. Right after, the MCPA calculates the total power requested by the mobile carriers in step 32 under the coverage of the MCPA. If the total power available from the MCPA is sufficient to power up all existing mobile carriers as determined in step 34, then instead of indifferently cutting all the per-channel power output in half, it is maintained at the level as stored in the memory (step 36). In other words, the initial maximum per-channel power output is maintained. If, back in step 34, the total available power does not have the ability to support the total requested power, the per-channel power output is adjusted evenly and set at a number determined by dividing the total available power by the total number of mobile carriers (step 38).

For example, assuming that the MCPA is first initialized for a maximum per-channel power output at 10 W with an expected number of mobile carriers of 10. It is further assumed that the MCPA has five modules and pools in a total of 100 W in power. The information for the maximum per-channel power output of 10 W is stored in the MCPA. When one MCPA module is detected to be in its failure mode, the MCPA calculates the available total power at the moment, which is now only 80 W. If the total power requested by the mobile carriers at the moment is still 100 W (10 W×10), then it is more than what the MCPA can supply, and then the per-channel power output will be set at 8 W (80 W/10). However, assuming there are two mobile carriers that are not active, instead of reducing the power output from 10 W to 8 W for every one, the MCPA will use the stored maximum per-channel power output, which is at 10 W, to reinitiate the output level since it has enough power to support at 10 W level for active mobile carriers.

In yet another embodiment of the present invention, instead of imparting evenly distributed per-channel power outputs, the MCPA can obtain information for an actual power request from each mobile carrier with the assistance of an external device such as a Switch. For instance, a mobile carrier may have requested only 5 W, while the MCPA initially sends out 10 W to every mobile carrier regardless of how much power each one asks for. This can be done by replacing step 32 of the flow diagram 10 with step 32b in which power requested by each mobile carrier is identified.

Referring to FIG. 3, a flow diagram 40 is shown for intelligently managing the MCPA output power according to another example of the present invention. In this embodiment, the maximum per-channel power output is determined and stored (step 44) during the initialization of the MCPA (step 42). The MCPA is monitored in steps 46 and 48. Once an MCPA module fails, the total available power output is calculated in step 50. Further, by dividing the total available power by the stored per-channel power output value, it can be calculated how many mobile carriers can be supported under the existing power supply condition in step 53. Then, the active mobile carriers at that moment are identified in step 52. A comparison is made to check whether the total number of identified active mobile carriers exceeds the calculated number of carriers in step 54. If not, the total number of active mobile carriers is less than or equal to the calculated number of mobile carriers and the MCPA will keep supplying power to active mobile carriers at the level of the stored maximum per-channel power output (step 56). If, back in step 54, the total number of active mobile carriers is more than the calculated number of carriers, the per-channel power output will be reduced across the board by dividing the total available power by the total number of active carriers in step 58.

Figure 4:
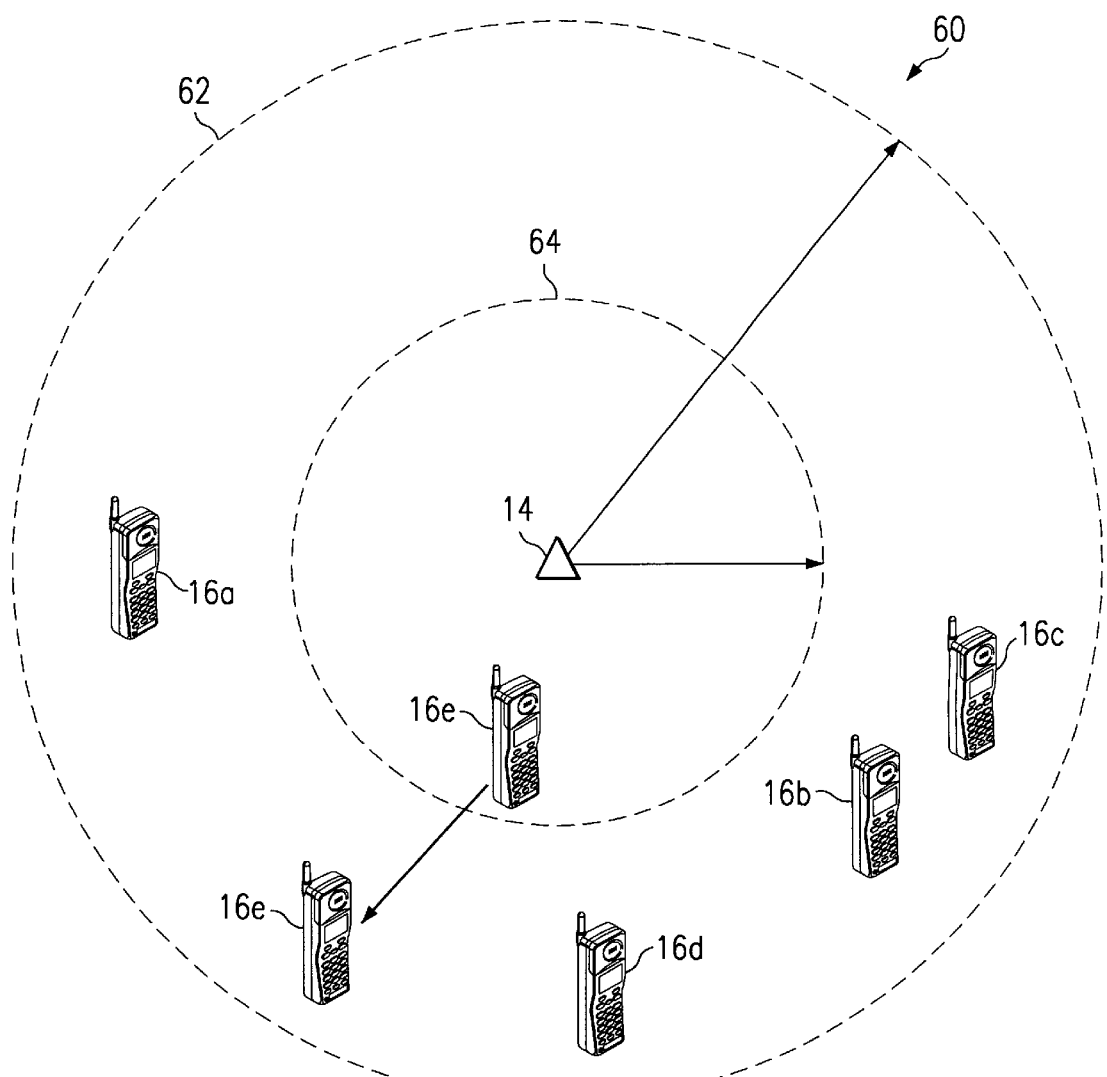
FIG. 4 is a graphical representation of a Multi-Channel Power Amplifier System's coverage area with five mobile carriers according to one example of the present invention.

Referring now to FIG. 4, a footprint 60 for the power output coverage of the MCPA is shown. The center of the footprint 60 is the MCPA 14 of FIG. 1. For illustration purposes, the outer circle 62 represents the footprint boundary for a power output level of 10 W per channel. The inner circle 64 represents the boundary of the footprint with a power output level of 6 W. It is further assumed that there are five mobile carriers (16a–16e) with four of them (16a–16d) initially requesting a per-channel power output of 10 W and one of them requesting 5 W (16e), and the MCPA has the intelligence built-in to instruct the transceivers to adjust the power level of each mobile carrier. Since the total available power for the MCPA is 50 W, the total power as requested by the mobile carriers does not exceed the limit of the MCPA.

In cases where a new mobile carrier comes in requesting a power level of 10 W, the switch can block the new mobile carrier knowing that the total available power of the MCPA can be surpassed by adding this mobile carrier.

In another scenario, when an existing mobile carrier, such as the mobile carrier 16e, moves from inside the 6 W footprint 64 to the territory covered by the 10 W footprint 62 whereas an increase of 5 W is requested. Since the mobile carrier was originally programmed to have 10 W in the initialization process, this may not have caused a breach of the maximum power output supplied by the MCPA in view of all other existing mobile carriers (16a–16d). However, if the MCPA is intelligent enough to monitor each mobile carrier for its actual power needed, a move of the mobile carrier may change the amount of power requested by the mobile carrier, and the total requested power may exceed what the MCPA can provide. In the immediate example, assuming the mobile carrier 16e's move causes a shortage of 5 W in terms of the total power available at the MCPA, adjustments may be made to reduce the per-channel power output for each mobile carrier evenly.

Figure 5:
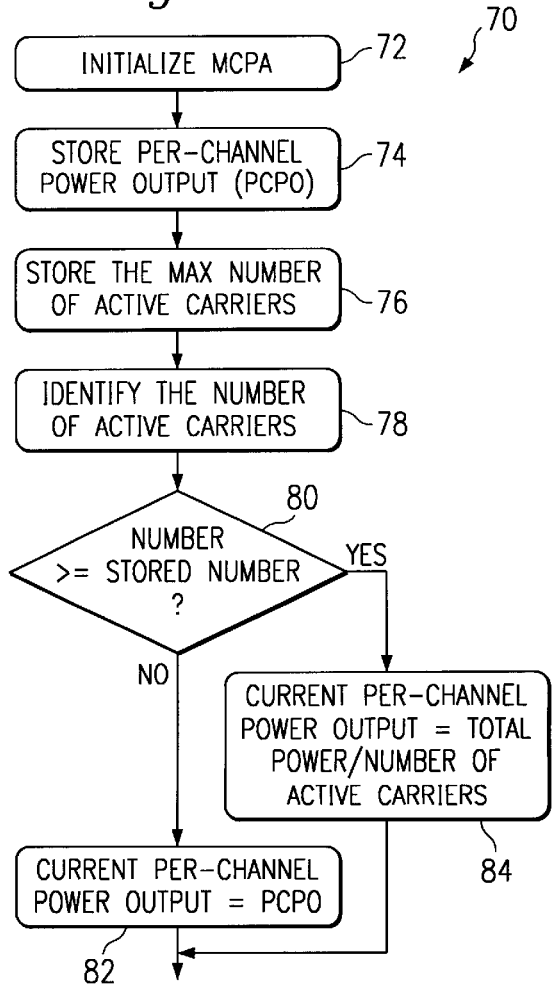
FIG. 5 illustrates a flow diagram illustrating an improved method for managing the power output of MCPA according to one example of the present invention.

Referring now to FIG. 5, a flow diagram 70 is illustrated to show an improved method for managing the power output of MCPA under this situation according to another example of the present invention. Steps 72 and 74 are similar to steps 22 and 24, and further in step 76, a maximum number of carriers that can be supported by the MCPA is also determined and stored. The number of active mobile carriers is constantly monitored in step 78, and a comparison process is done in step 80 to check whether the total number of active mobile carriers is more than the stored maximum number of carriers. If the maximum number of active mobile carriers is not exceeded, the per-channel power output will be set at the stored per-channel power output level at step 82 regardless of whether the carriers are newly added to the footprint or whether they have moved and requested more power from the MCPA. Otherwise, the per-channel power output will be reset at a level determined by dividing the total power available from the MCPA by the number of active carriers.

According to another example of the present invention, the power management of the MCPA can be further improved by monitoring the Bit Error Rate (BER) of each mobile carrier (16a–16e of FIG. 4). For example, the BER of the moved mobile carrier (16e) will be closely monitored, and power will be given to the extent that there is anything left from the MCPA (e.g., 5W). However, at any time, the MCPA has the option to drop the mobile carrier 16e based on its BER performance, thereby maintaining the power level of other mobile carriers.

If the minimum per-channel power output requested by each mobile carrier added together exceeds the total available power provided by the MCPA when the mobile carrier 16e moves or even as a new mobile carrier is added to the footprint, based on the total number of mobile carriers under its coverage, the MCPA would uniformly reduce the per-channel power output and monitor the BER of each mobile carrier through the transceiver. Hence, any of the mobile carriers under the coverage of the MCPA can be terminated if its BER indicates that it is communicating on a very week signal at the reduced power level.

The above disclosure provides many different embodiments, or examples, for implementing different features of the invention. Also, specific examples of components and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for intelligently managing a multi-channel power amplifier (MCPA) in a telecommunications network, the MCPA having a plurality of amplifier modules, the method comprising the steps of:

storing a maximum value of per-channel power output under the coverage of the MCPA as determined in an initialization process of the MCPA;

calculating a total power available from the MCPA following a failure of at least one amplifier module;

obtaining a total requested power of a plurality of mobile carriers upon the failure of the amplifier module; and providing each mobile carrier with the stored maximum value of per-channel power output if the obtained total requested power of mobile carriers is less than or equal to the calculated total power available from the MCPA.

2. The method of claim 1 wherein the step of providing further includes a step of identifying a total number of active mobile carriers upon the failure of the amplifier module.

3. The method of claim 1 wherein the step of providing further includes a step of reducing the per-channel power output for each mobile carrier output if an obtained total number of mobile carriers is more than a stored maximum number of mobile carriers.

4. The method of claim 1 wherein the obtained total requested power is calculated assuming each mobile carrier is at the level of the stored maximum value of per-channel power output.

5. The method of claim 1 wherein the obtained total requested power is calculated based on the actual power needed by each mobile carrier.

6. A method for intelligently managing a multi-channel power amplifier (MCPA) in a telecommunications network, the MCPA having a plurality of amplifier modules, the method comprising the steps of:

storing a maximum value of per-channel power output under the coverage of the MCPA as determined in an initialization process of the MCPA;

calculating a total power available from the MCPA upon a failure of at least one amplifier module;

obtaining a maximum number of mobile carriers supportable by the MCPA upon the failure of the amplifier module;

identifying a total number of the active mobile carriers; and providing each mobile carrier with the stored per-channel power output if the identified total number of active mobile carriers is less than or equal to the calculated maximum number of mobile carriers.

7. The method of claim 6 wherein the step of providing further includes reducing the per-channel power output for each mobile carrier output if the identified total number of active mobile carriers is more than the calculated maximum number of mobile carriers.

8. The method of claim 6 wherein the step of calculating further includes a step of monitoring the MCPA for detecting the failure of the amplifier module.

9. A method for intelligently managing a multi-channel power amplifier (MCPA) in a telecommunications network, the MCPA having a plurality of amplifier modules, the method comprising the steps of:

storing a maximum value of per-channel power output under the coverage of the MCPA and a maximum number of mobile carriers supportable by the MCPA as determined in an initialization process of the MCPA;

monitoring a total number of the active mobile carriers; and adjusting the per-channel power output for each mobile carrier according to a change of the monitored total number of the active mobile carriers wherein the step of adjusting further includes the step of reducing the per-channel power output evenly for each mobile carrier if a total power available at the MCPA is less than or equal to a total power requested by each monitored mobile carrier;

wherein the step of reducing further includes the steps of:
monitoring a Bit Error Rate (BER) of each active mobile carrier; and
eliminating a supply of the power from the MCPA to a mobile carrier if the monitored BER is more than a predetermined value.

10. The method of claim 9 wherein the step of adjusting further includes the step of maintaining the per-channel power output for each mobile carrier at the level of the stored per-channel power output if the monitored total number of the active mobile carriers is less than or equal to the stored maximum number of mobile carriers supportable by the MCPA.

11. The method of claim 9 wherein the step of adjusting further includes the step of reducing the per-channel power output evenly for each mobile carrier if the monitored total number of the active mobile carriers is more than the stored maximum number of mobile carriers supportable by the MCPA.

12. A system for intelligently managing a multi-channel power amplifier (MCPA) in a telecommunications network, the MCPA having a plurality of amplifier modules, the system comprising:
a storage device for storing a maximum value of per-channel power output under the coverage of the MCPA as determined in an initialization process of the MCPA;
a processing device for calculating a total power available from the MCPA upon a failure of at least one amplifier module;
a first circuit for obtaining a total requested power of mobile carriers upon the failure of the amplifier module; and
a second circuit for providing each mobile carrier with the stored maximum value of per-channel power output if the obtained total requested power of mobile carriers is less than or equal to the calculated total power available from the MCPA.

13. The system of claim 12 further includes a third circuit identifying a total number of active mobile carriers upon the failure of the amplifier module.

14. The system of claim 12 wherein the second circuit for providing further includes means for reducing the per-channel power output for each mobile carrier output if the obtained total number of mobile carriers is more than the stored maximum number of mobile carriers.

15. The system of claim 12 wherein the obtained total requested power is calculated assuming each mobile carrier is at the level of the stored maximum value of per-channel power output.

16. The system of claim 12 wherein the obtained total requested power is calculated based on the actual power needed by each mobile carrier.

17. A system for intelligently managing a multi-channel power amplifier (MCPA) in a telecommunications network, the MCPA having a plurality of amplifier modules, the system comprising:
a storage device for storing a maximum value of per-channel power output under the coverage of the MCPA as determined in an initialization process of the MCPA;
means for calculating a total power available from the MCPA upon a failure of at least one amplifier module;
means for obtaining a maximum number of mobile carriers supportable by the MCPA upon the failure of the amplifier module;
means for identifying a total number of the active mobile carriers; and
means for providing each mobile carrier with the stored per-channel power output if the identified total number of active mobile carriers is less than or equal to the calculated maximum number of mobile carriers.

18. The system of claim 17 wherein the means for providing further includes means for reducing the per-channel power output for each mobile carrier output if the identified total number of active mobile carriers is more than the calculated maximum number of mobile carriers.

19. The system of claim 17 wherein the means for calculating further includes means for monitoring the MCPA for detecting the failure of the amplifier module.

20. A system for intelligently managing a multi-channel power amplifier (MCPA) in a telecommunications network, the MCPA having a plurality of amplifier modules, the system comprising:
a storage device for storing a maximum value of per-channel power output under the coverage of the MCPA and a maximum number of mobile carriers supportable by the MCPA as determined in an initialization process of the MCPA;
means for monitoring a total number of the active mobile carriers; and
means for adjusting the per-channel power output evenly for each mobile carrier according to a change of the monitored total number of the active mobile carriers
wherein the means for reducing further includes means for:
monitoring a Bit Error Rate (BER) of each active mobile carrier; and
eliminating a supply of the power from the MCPA to a mobile carrier-if the monitored BER is more than a predetermined value.

21. The system of claim 20 wherein the means for adjusting further includes the means for maintaining the per-channel power output for each mobile carrier at the level of the stored per-channel power output if the monitored total number of the active mobile carriers is less than or equal to the stored maximum number of mobile carriers supportable by the MCPA.

22. The system of claim 20 wherein the means for adjusting further includes means for reducing the per-channel power output evenly for each mobile carrier if the monitored total number of the active mobile carriers is more than the stored maximum number of mobile carriers supportable by the MCPA.

23. The system of claim 20 wherein the means for adjusting further includes means for reducing the per-channel power output evenly for each mobile carrier if a total power available at the MCPA is less than or equal to a total power requested by each monitored mobile carrier.

* * * * *